United States Patent [19]

Sellers

[11] Patent Number: 4,759,826
[45] Date of Patent: Jul. 26, 1988

[54] PROCESS FOR PURIFYING THIONYL CHLORIDE

[75] Inventor: Gary M. Sellers, Buffalo, N.Y.

[73] Assignee: Occidental Chemical Corporation, Niagara Falls, N.Y.

[21] Appl. No.: 922,435

[22] Filed: Oct. 23, 1986

[51] Int. Cl.⁴ .............................................. B01D 3/34
[52] U.S. Cl. ......................................... 203/29; 203/82; 203/84; 203/DIG. 6; 423/468
[58] Field of Search .................. 203/28, 29, 41, 71, 203/81, 82, 84, DIG. 6; 423/468

[56] References Cited

U.S. PATENT DOCUMENTS

| | | |
|---|---|---|
| 1,765,688 | 6/1930 | McKee et al. ............ 423/468 |
| 2,401,644 | 6/1946 | Iler .............................. 423/468 |
| 2,420,623 | 5/1947 | Salzenberg et al. ......... 423/468 |
| 2,431,823 | 12/1947 | Pechukas .................... 423/468 |
| 2,529,671 | 11/1950 | Bissinger .................... 423/468 |
| 2,539,679 | 1/1951 | Trager ........................ 423/468 |
| 2,779,663 | 1/1957 | Trager ........................ 423/468 |
| 3,155,457 | 11/1964 | Kunkel ........................ 423/468 |
| 3,419,353 | 12/1968 | Horvath et al. ............. 423/468 |
| 4,337,235 | 6/1982 | Wisnouskas et al. ........ 423/468 |
| 4,338,290 | 6/1983 | Jonas .......................... 203/29 |

FOREIGN PATENT DOCUMENTS

| | | | |
|---|---|---|---|
| 0042530 | 12/1981 | European Pat. Off. ...... | 423/468 |
| 0865779 | 9/1981 | U.S.S.R. ..................... | 423/468 |

Primary Examiner—S. Leon Bashore
Assistant Examiner—V. Manoharan
Attorney, Agent, or Firm—James F. Tao; William G. Gosz

[57] ABSTRACT

An improved process for purifying thionyl chloride by the double distillation of an impure mixture of thionyl chloride, sulfuryl chloride, sulfur monochloride, sulfur dichloride and sulfur dioxide is disclosed. The double distillation process is conducted in the presence of sulfur to convert sulfur dichloride into sulfur monochloride. The sulfuryl chloride content of the mixture is reduced by contacting the vapor from the reboiler in the first stage distillation with activated carbon prior to fractional distillation in the column. The product of the first stage distillation is then redistilled to produce a thionyl chloride product of high purity.

3 Claims, 2 Drawing Sheets

PROCESS FOR PURIFYING THIONYL CHLORIDE

BACKGROUND OF THE INVENTION

This invention relates to an improved process for purifying thionyl chloride by the double distillation of an impure mixture of thionyl chloride in the presence of sulfur. The thionyl chloride produced by this process is extremely pure and therefore suitable for uses requiring low levels of impurities.

Thionyl chloride ($SOCl_2$) is a chemical compound which is widely used in the preparation of chemical intermediates for pharmaceuticals, dyestuffs and related chemicals. It is a versatile chlorinating agent which reacts with a variety of organic functional groups, and often is the reagent of choice for this purpose since the by-products are gases which are easily removed from the reaction product. A highly pure product is important to many customers since small amounts of impurities will cause an objectionable discoloration of the product.

Thionyl chloride is prepared commercially by a number of different processes. One process involves the vapor phase reaction of sulfur monochloride ($S_2Cl_2$), sulfur dioxide and chlorine over an activated carbon catalyst. This reaction is shown below:

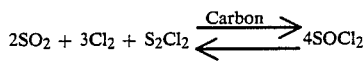

(1)

The impurities found in products produced according to reaction (1) are mainly mixtures of sulfur chlorides, e.g. sulfur monochloride and sulfur dichloride, sulfuryl chloride, sulfur dioxide and chlorine. The atmospheric boiling points of these components are as follows:

Thionyl chloride: 78° C.
Sulfuryl chloride: 69° C.
Sulfur monochloride: 138° C.
Sulfur dichloride: 59° C.
Sulfur dioxide: −10° C.
Chlorine: −35° C.

The chlorine, sulfur dioxide and sulfur monochloride components can be separated from the mixture with relative ease due to the difference in boiling points. However, the sulfur dichloride and sulfuryl chloride are not that easily separated, particularly when a high purity product is required. This problem is compounded by the fact that at normal distillation temperatures thionyl chloride decomposes in the presence of sulfur.

Complete purification of the product by simple distillation is very tedious, requiring many steps and the removal of by-products. Decomposition of the thionyl chloride may occur under these conditions, further hampering purification and reducing the yield. Multiple distillations offer incremental improvements in product purity but do not result in significant reduction in the sulfuryl chloride content. These approaches are therefore not considered satisfactory from a commercial standpoint.

Methods of purifying impure or crude thionyl chloride have been developed using organic compounds such as styrene, octene, and decene. Although these compounds react with the sulfur chlorides to remove some impurities, they also result in a significant decrease in thionyl chloride yield, leave an unstable residue in the product, and increase its organic carbon content.

The addition of sulfur and aluminum trichloride to the distillation column is disclosed in U.S. Pat. No. 4,337,235 to Wisnouskas, issued June 29, 1982, and U.S. Pat. No. 4,388,290 to Jonas, issued June 14, 1983. This process results in the reduction of both sulfur chlorides and sulfuryl chloride impurities. However, this approach is too costly for commercial use.

A procedure commonly used today is the double distillation of impure thionyl chloride in the presence of sulfur. This technology is described in U.S. Pat. No. 3,155,457 to Kunkel, issued Nov. 3, 1964, the disclosure of which is incorporated herein by reference. This process is effective in converting sulfur dichloride to sulfur monochloride which can then be readily separated by distillation, but it does not remove significant amounts of sulfuryl chloride.

None of the above described processes are entirely effective in purifying crude thionyl chloride either due to ineffectiveness or poor economics.

It is therefore a principle object of the present invention to provide a cost effective thionyl chloride purification process which will produce a thionyl chloride product which is suitable for use in applications requiring very low levels of impurities.

SUMMARY OF THE INVENTION

In accordance with the present invention, a process for purifying crude or impure thionyl chloride comprises the double distillation of impure thionyl chloride in the presence of sulfur. In the first stage distillation, the vapor from the reboiler is contacted with activated carbon prior to being introduced into the distillation column. The use of sulfur is effective in reducing the sulfur chloride content of the impure mixture, while the activated carbon is effective in reducing the sulfuryl chloride content.

This process is effective in producing a thionyl chloride product which contains less than about 0.1% sulfuryl chloride. The purity of this product is sufficient for use in a variety of end-product applications where such purity is considered essential.

DESCRIPTION OF THE PREFERRED EMBODIMENTS

Thionyl chloride is produced by the reaction of a sulfur chloride, such as sulfur monochloride, with chlorine and sulfur dioxide or sulfur trioxide as shown in reaction (1) above. Reaction (1) is typically conducted in the vapor phase in the presence of activated carbon which serves as a catalyst for the reaction. This reaction produces, in addition to thionyl chloride, various impurities such as sulfur dichloride and sulfuryl chloride as reaction by-products. These by-products, in addition to the unreacted sulfur dioxide, chlorine and sulfur monochloride, are the principle contaminants or impurities in the product.

A typical crude or impure thionyl chloride prepared according to reaction (1) contains only about 70% to about 85% thionyl chloride, the balance being primarily various sulfur chloride impurities as shown below:

Sulfuryl chloride: 0.31%
Sulfur dioxide: 0.15%
Sulfur monochloride: 6.96%
Sulfur dichloride: 12.45%
Thionyl chloride: 80.13%

Separation of the thionyl chloride by distillation is difficult due to the unfavorable relative volatilities of sulfur dichloride and sulfuryl chloride which would require an excessive reflux ratio and excessive numbers of distillation plates for moderate high purity thionyl recoveries. The fact that decomposition occurs at elevated (distillation) temperatures makes this system even more complicated since side reactions can occur under these circumstances.

The addition of elemental sulfur to the distillation reboiler shifts the equilibrium of reaction (2) below to the right, thereby converting a low boiling impurity to a high boiler:

$$SCl_2 + S \rightleftharpoons S_2Cl_2 \qquad (2)$$

The boiling point of the sulfur monochloride is sufficiently high to remain in the reboiler and not be distilled. The operable temperature of the distillation process is therefore below the boiling point of sulfur monochloride (138° C.) and above the boiling point of thionyl chloride (78° C.). In practice, the temperature in the reboiler is not constant during distillation, but will increase from 78° C. to about 130° C. This increase in temperature changes the reaction rates and the final equilibrium that is attained. The decomposition rate of thionyl chloride is increased by increasing the temperature, but the change in equilibrium constant will decrease the amount of decomposition.

A second or finishing distillation is used to further purify the product of the first distillation by redistilling the product. Sulfur is also added to the second or finishing distillation to prevent the formation of sulfur dichloride which has a large impact on the color of the product. In a typical double distillation process, sulfuryl chloride is the single largest impurity.

Figure 1:
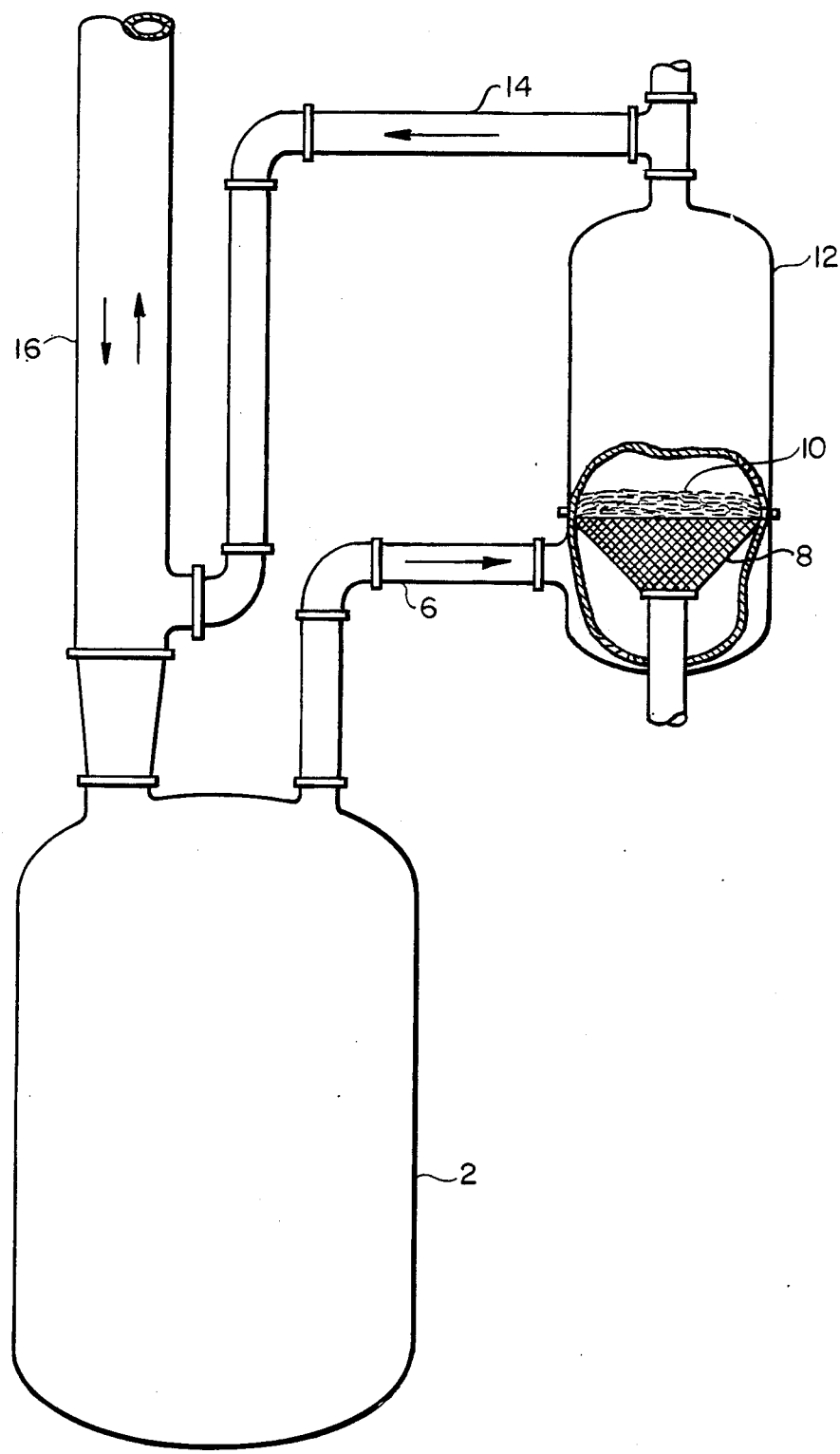
FIG. 1 is a perspective view of a first stage distillation apparatus which is used to purify thionyl chloride according to the process of this invention.

The process of this invention employs activated carbon to reduce the sulfuryl chloride content of the final product. Referring to FIG. 1, the activated carbon 10 is contained in a catalyst vessel 12 which is attached to an existing distillation apparatus. In the operation of the process of this invention, crude thionyl chloride and sulfur are placd in the distillation pot or reboiler 2. A distillation column 16 is placed over the reboiler and a condenser (not shown) for removing product is located at the top of the distillation column. The vapor product in the reboiler is passed through line 6 into the catalyst vessel containing the activated carbon 10 in basket 8 prior to entering the bottom of the distillation column through line 14. Reflux from the top of the column is returned to the reboiler without contacting the activated carbon. It is essential that the activated carbon remain dry. For this reason, it is useful to preheat the inlet vapors 6 to the catalyst vessel to prevent condensation. The activated carbon catalyst serves to decompose the sulfuryl chloride into sulfur dioxide and chlorine as follows:

$$SO_2Cl_2 \xrightarrow{\text{Carbon}} SO_2 + Cl_2 \qquad (3)$$

At normal distillation temperatures, the temperature and composition of the vapor from the reboiler favor the decomposition of sulfuryl chloride as shown in reaction (3).

The use of an activated carbon catalyst to decompose sulfuryl chloride results in an increase in the sulfur dichloride level of the product. For this reason, the activated carbon treatment is only used during the first stage distillation and not during the finishing distillation. Sulfur dioxide and chlorine are removed by degassing during the first and second stages.

The vapor phase carbon treatment for reducing the sulfuryl chloride in thionyl chloride is only effective with feed streams having less than the equilibrium amount of sulfur dioxide and chlorine. The direction of reaction (3) depends on the equilibrium constant and the initial concentrations of reactants and products. The equilibrium constant increases with decreasing temperature. However, when the initial concentrations of reactants and products are small, due to the dilution of sulfuryl chloride with thionyl chloride and sulfur chlorides, the equilibrium still results in nearly complete decomposition of sulfuryl chloride at normal distillation temperatures.

It is significant that no appreciable decomposition of sulfuryl chloride occurs in the absence of a catalyst. In the presence of activated carbon, however, reaction (3) is accelerated significantly. It has been found that a minimum residence time of 0.05 seconds is required for adequate removal of sulfuryl chloride.

In general, any activated carbon is effective in the process of this invention. Preferably, a high surface area carbon is employed. A particularly effective activated carbon is Barnaby Cheney BD-1. Using this activated carbon catalyst and a residence time of about 0.1 seconds, a 90% reduction of sulfuryl chloride content can be achieved. A typical final product composition using the process of this invention is as follows:

Thionyl Chloride: 99.65%
Sulfuryl Chloride: 0.05%
Sulfur Dichloride: 0.10%
Sulfur Dioxide: 0.20%

The following examples are intended to further illustrate various embodiments of the present invention without limiting it thereby.

EXAMPLE 1

A full scale double distillation assembly was used to purify a feed stream of crude thionyl chloride. The double distillation assembly consisted of two (2) distillation apparatus operating in tandem. Each distillation apparatus consisted of a reboiler, a distillation column and a condenser. The distillate from the first stage condenser was used as a feed for the second stage or finishing distillation reboiler. Sulfur was fed to both reboilers. The thionyl chloride content of the feed composition was varied from 77% to 85%. The product of the finishing distillation had an average composition as follows:

| SOCl$_2$ | SO$_2$Cl$_2$ | SCl$_2$ | S$_2$Cl$_2$ | SO$_2$ |
|---|---|---|---|---|
| 99.40% | 0.30% | 0.10% | | 0.20% |

EXAMPLES 2-4

Figure 2:
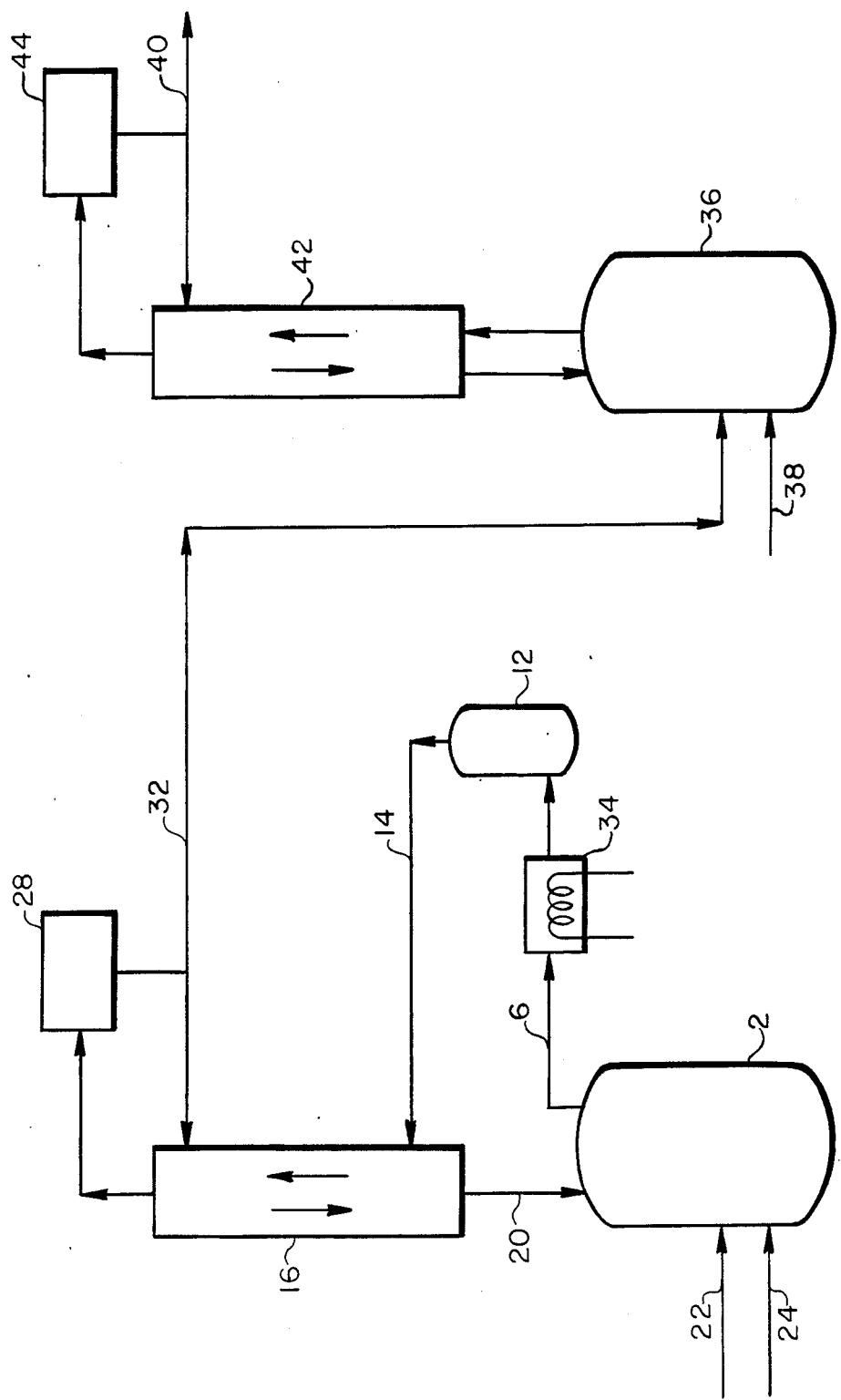
FIG. 2 is a flow diagram of the double distillation system of the present invention showing both the first stage and second stage distillation apparatus.

The double distillation apparatus of Example 1 was modified as shown in FIG. 2 by placing an activated carbon bed 12 between the reboiler 2 and the distillation column 16 of the first stage distillation apparatus. The vapor 6 leaving the reboiler 2 was heated in heater 34 and channelled into the carbon bed 12 and exhausted into the column through line 14. Reflux from the column 20 did not contact the activated carbon in the bed. The carbon bed was filled with Barnaby Cheney BD-1 carbon.

The double distillation apparatus was again used to purify a feed stream of crude thionyl chloride 22. As in Example 1, the double distillation assembly consisted of two (2) distillation apparatus operating in tandem. Each distillation apparatus consisted of a reboiler, 2 and 36, a distillation column, 16 and 42, and a condenser, 28 and 44. Part of the distillate from the first stage condenser 32 was used as a feed for the second stage or finishing distillation reboiler 36, while part of the distillate is returned to column 16 as reflux. Sulfur was fed to both reboilers at 24 and 38, respectively, and product was recovered at 40. The results of three (3) production runs were as follows:

|  | $SOCl_2$ | $SO_2Cl_2$ | $SCl_2$ | $S_2Cl_2$ | $SO_2$ |
|---|---|---|---|---|---|
| Example 2 |  |  |  |  |  |
| Crude thionyl | 71.89% | 0.90% | 26.70% |  | 0.50% |
| Once distilled | 98.23% | 0.02% | 0.35% | 0.80% | 0.60% |
| Finished product | 99.62% | 0.02% | 0.10% | 0.02% | 0.24% |
| Example 3 |  |  |  |  |  |
| Crude thionyl | 71.89% | 0.90% | 26.70% |  | 0.50% |
| Once distilled | 98.54% | 0.02% | 0.69% | 0.15% | 0.60% |
| Finished product | 99.82% | 0.04% | 0.01% | 0.08% | 0.06% |
| Example 4 |  |  |  |  |  |
| Crude thionyl | 73.50% | 1.20% | 25.20% |  | 0.10% |
| Once distilled | 97.90% | 0.03% | 1.15% | 0.12% | 0.80% |
| Finished product | 99.79% | 0.03% | 0.04% | 0.07% | 0.07% |

As shown above, the use of an activated carbon catalyst is effective in reducing the sulfuryl chloride content of the final product by an order of magnitude, i.e. from 0.30% to an average of 0.03%.

Although various embodiments of this invention have been shown and described in the specification, this invention is intended to be construed liberally and not limited by an specific embodiments as will be readily appreciated by those skilled in the art. It is to be understood, therefore, that the appended claims are intended to cover all modifications and variations which are within the spirit and scope of the present invention.

What is claimed is:

1. A process for purifying an impure mixture containing from about 70% to about 85% of thionyl chloride and impurities including sulfuryl chloride, sulfur monochloride, sulfur dichloride and sulfur dioxide, said process comprising the steps of:
    (a) vaporizing said impure mixture in a first reboiler in a first distillation apparatus at a temperature of from about 78° C. to about 138° C. in the presence of sulfur to reduce the sulfur dichloride content of the mixture,
    (b) contacting the vapor from the first reboiler with activated carbon in a catalyst vessel for at least 0.05 seconds to reduce the sulfuryl chloride content of the vapor,
    (c) passing the vapor from the catalyst vessel into the bottom of a first distillation column,
    (d) withdrawing distilled vapor from the top of the first distillation column and condensing the distilled vapor,
    (e) returning part of the condensed vapor to the first distillation column as reflux without contacting the activated carbon,
    (f) passing part of the condensate to a second distillation apparatus and fractionally redistilling the condensate in the presence of sulfur to further reduce the sulfur dichloride content of the condensate, and
    (g) recovering purified thionyl chloride from the redistillation of the condensate in step (f).

2. The process of claim 1 wherein the vapor from the first reboiler is heated prior to contacting the activated carbon.

3. The process of claim 1 wherein the impure thionyl chloride is prepared by reacting sulfur monochloride, sulfur dioxide and chlorine in the presence of activated carbon.

* * * * *